J. W. REID.
TRACTION AND NON-SKID DEVICE.
APPLICATION FILED MAR. 16, 1911.
1,017,909.
Patented Feb. 20, 1912.
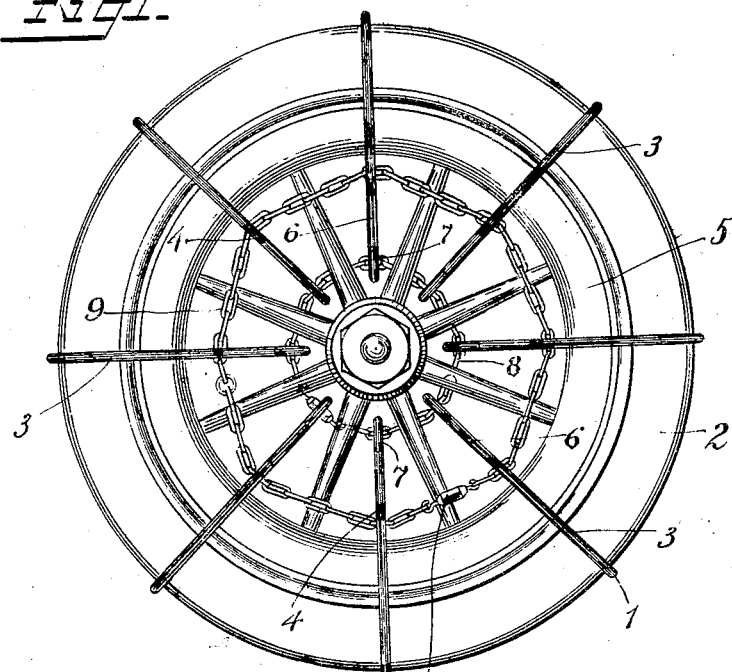
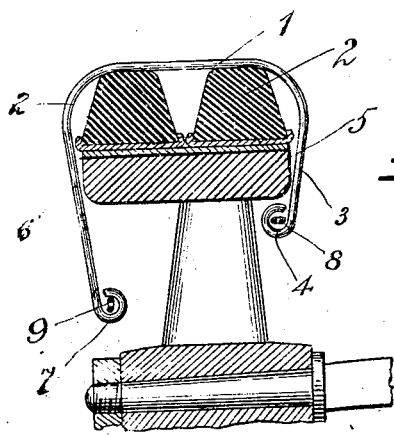
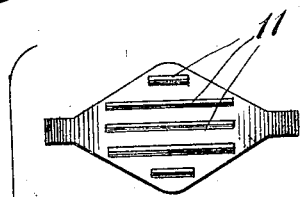
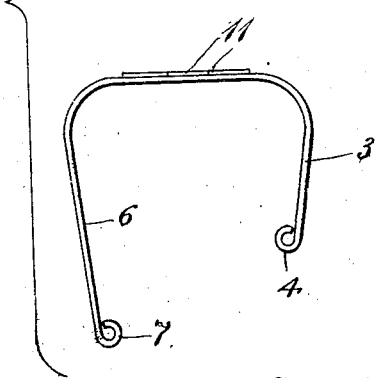
Inventor
JAMES W. REID
Witnesses:

UNITED STATES PATENT OFFICE.

JAMES W. REID, OF NEW YORK, N. Y.

TRACTION AND NON-SKID DEVICE.

1,017,909.

Specification of Letters Patent. Patented Feb. 20, 1912.

Application filed March 16, 1911. Serial No. 614,772.

*To all whom it may concern:*

Be it known that I, JAMES W. REID, a citizen of the United States, residing at New York, county of New York, State of New York, have invented certain new and useful Improvements in Traction and Non-Skid Devices, of which the following is a full, clear, and exact description.

My invention relates to traction and antiskid devices for motor vehicles, and is particularly, though not exclusively, adapted for use on automobile trucks which are usually provided with double solid cushion tires.

The object of the invention is to provide a device which may be readily applied and removed; any of the parts of which may be readily replaced if worn out or broken; and one which is so arranged as to interfere as little as possible with the running of the driving gear of the vehicle.

A further object is to provide a device which may be susceptible to a more varied adjustment and with which the adjustment may be effected on the more accessible or outer side of the wheel.

With these and other objects which will appear in the following specification in view, the invention consists in a construction and arrangement of parts, a preferred embodiment of which is illustrated in the accompanying drawings, in which—

Figure 1 is a side elevation of a wheel provided with the device, viewed from the inner side of the wheel. Fig. 2 is a sectional view through the tire and felly. Fig. 3 comprises a plan and side elevation of one form of traction or tread element which may be used with the device.

In the embodiment herein illustrated, the invention comprises a plurality of J-shaped bails or tread members, each consisting of a cross arm or tread portion 1 adapted to rest upon the outer rim of the cushion tire 2. One end of the traction member terminates in a short arm or hook 3 which takes over the felly, with the hook portion 4 located just inside the felly 5. The opposite end of the traction member is prolonged into a second longer hook member 6, having a hook portion 7. Each traction member is preferably made of spring metal and, as shown in Fig. 2, the short and long hook members 3 and 6 respectively are shaped to extend toward each other so that the hook portions 4 and 7 respectively will lie well within the plane of the side of the felly when the traction member is in position. By this construction the danger of the catching of the hook members upon objects beside the vehicle, or of interference of the inner hook members with the driving or other running gear of the vehicle, is largely avoided. The several traction members of the device are connected by means of chains or cables 8 and 9 respectively, which pass through the hooks or loops on the ends of the hook members 3 and 6 respectively. The chains may each be provided with a hook and turn-buckle 10 whereby the ends of the chains may be connected, when the device is applied to a wheel, or disconnected for removal of the same, and the chains may be tightened to hold the traction members tightly in place.

In applying the device to a vehicle wheel, the chain 8 of the inner or shorter hook members 3 is disconnected and the short hook members are placed over the tire with the inner hooks located at the side of the rim of the wheel just inside the felly. The outer arms 6 are then swung out over the wheel and are brought down to the outer side with the hooks 7 extending well within the felly 5. The inner chain is then connected and tightened and finally the outer chain is connected and tightened, thereby drawing the non-skid members 1 snugly down over the tire and holding the device firmly in position. It will be seen that the form of the device and manner of fastening the same are such as not to interfere with the normal creeping action of the device around the tire. The traction members may consist of straight cross bars extending over the tire from side to side, if desired, or, they may take the form of tread plates, of various shapes, such, for example, as that shown in Fig. 3, in which the tread plates are provided with traction ribs 11.

From the above description it will be seen that the device may be very readily applied to a wheel and that by reason of the short length of the inner arms 3, interference with the driving mechanism or brake drums on the driving axle of the vehicle will be entirely avoided, since these arms may be made of such a length as to locate the hook 4 immediately within the felly and hence spaced well away from the hub or axle.

While in the drawings I have shown the chains which connect the ends of the arms as passing freely through loops on the ends thereof, it is obvious that such chains or cables might be connected at spaced intervals with said arm members so as to guarantee uniform spacing at all times. Such an arrangement would be too obvious to require special illustration: for example, the hooks 4 or 7 might simply be passed through the links in the chains. Again, in some instances, by reason of the improved construction herein shown, a chain or cable might be omitted for the ends of the shorter arms, since such arms intend to hook under the felly and are retained thereby.

While I have herein described a particular embodiment of my invention, the same may be altered in detail or relative arrangement of parts within the scope of the appended claims.

What I claim is:

1. A traction and anti-skid device comprising a plurality of traction members, each being substantially of J-shape and having its ends extending radially of the wheel, the short end of each traction member terminating in an offset portion adapted to extend within the felly of the wheel, the longer ends extending to points adjacent the hub of the wheel, and connecting members adapted to connect the longer ends of said traction members.

2. A traction and anti-skid device comprising a plurality of traction members, each being of substantially J-shape, the shorter arm of each member being shaped to extend within and closely adjacent to the felly of the wheel, the other arm being of a length to extend well toward the hub of the wheel, flexible connecting members for connecting the ends of said traction members upon each side of the wheel respectively.

3. In a traction device for wheels, a plurality of hook shaped bails arranged to extend over and across the tread of a wheel, the bail ends extending inwardly toward the middle portion of said wheel, one of said bail ends being longer than the other, and means for holding all of said bails in contact with the thread of a wheel, the shorter bail ends hooking under the felly of the wheel.

JAMES W. REID.

Witnesses:
R. C. MITCHELL,
E. E. MORSE.